(12) United States Patent
Higgins

(10) Patent No.: US 11,261,991 B1
(45) Date of Patent: Mar. 1, 2022

(54) HYDRAULIC VALVE SPOOL ASSEMBLY WITH METERING LAND SECTIONS

(71) Applicant: Striped Monkey IP, Raleigh, NC (US)

(72) Inventor: Daniel James Higgins, Gastonia, NC (US)

(73) Assignee: STRIPED MONKEY IP, Raleigh, NC (US)

(*) Notice: Subject to any disclaimer, the term of this patent is extended or adjusted under 35 U.S.C. 154(b) by 0 days.

(21) Appl. No.: 16/950,960

(22) Filed: Nov. 18, 2020

(51) Int. Cl.
*F16K 11/07* (2006.01)
*F16K 31/122* (2006.01)
*F16K 11/22* (2006.01)

(52) U.S. Cl.
CPC ...... *F16K 31/1225* (2013.01); *F16K 11/0712* (2013.01); *F16K 11/22* (2013.01); *F16K 31/1223* (2013.01); *F16K 11/07* (2013.01)

(58) Field of Classification Search
CPC ............. F16K 31/1223; F16K 31/225; F16K 31/1226; F16K 11/22; F16K 11/0712; F16K 11/07
See application file for complete search history.

(56) References Cited

U.S. PATENT DOCUMENTS

| | | | | | |
|---|---|---|---|---|---|
| 2,176,594 | A | * | 10/1939 | Nordstrom | F16K 31/1225 251/56 |
| 2,469,921 | A | * | 5/1949 | Hoge | F16K 11/0712 137/625.42 |
| 2,764,181 | A | * | 9/1956 | Richolt | F16K 11/0712 137/625.37 |
| 4,130,133 | A | * | 12/1978 | Sullivan | F16K 11/22 137/512.5 |
| 2004/0099320 | A1 | * | 5/2004 | Oniduka | F16K 11/07 137/625.66 |

* cited by examiner

*Primary Examiner* — Umashankar Venkatesan
(74) *Attorney, Agent, or Firm* — NK Patent Law

(57) ABSTRACT

System for hydraulic valve assembly comprises a valve body having a cylindrical internal cavity and an axially moveable cylindrical spool supported therein. Hydraulic ports are defined through the valve body. The spool includes one or more radially oriented fluid control floating lands. Each floating land is configured to control one or more of fluid flow from a hydraulic port, and fluid flow to a hydraulic port. Each floating land includes a cylindrical control slide defining a hollow chamber, and an end section. The control slide is axially movable relative to the end section between a retention position and an extension position to thereby control one or more of fluid flow from the hydraulic port, and fluid flow to the hydraulic port.

15 Claims, 11 Drawing Sheets

HYDRAULIC VALVE SPOOL ASSEMBLY WITH METERING LAND SECTIONS

TECHNICAL FIELD

The present invention relates to hydraulic systems, and specifically to a hydraulic control valve assembly for hydraulic fluid control of a power equipment such as a skid steer loader.

BACKGROUND ART

Hydraulically operated equipment such as skid loaders require a hydraulic control valve to translate an operator's control directions into pressurized hydraulic fluid movements used to actuate and manipulate a hydraulic cylinder-piston arrangement of a hydraulic power element such as a lift arm and a lift bucket. The operator uses a control mechanism, for e.g., a control joystick or a pilot control, to control the various hydraulic power elements. The control linkage from the control mechanism to the hydraulic control valve acting on the control spool of the hydraulic control valve can be a pilot operated hydraulic control operating via pressurized hydraulic lines, and mechanical linkages. The operator typically evaluates the effectiveness of work done by the hydraulic cylinder-piston arrangement by physically viewing the work done by the hydraulic cylinder-piston arrangement. The operator throttles the flow of pressurized hydraulic fluid to the hydraulic cylinder-piston arrangement by manually adjusting the force supplied to the control joystick to thereby adjust the quality and magnitude of the work done by the hydraulic cylinder-piston arrangement.

It would be beneficial to have an improved hydraulic system that provides for an improved hydraulic fluid control assembly that permits retrofitting of existing hydraulic systems without extensive modifications or rework.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

The present disclosure describes implementations that relate to a hydraulic valve assembly. According to various embodiments of the presently disclosed subject matter, the hydraulic valve assembly comprises a valve body having a cylindrical internal cavity, an axially moveable cylindrical spool supported within the cavity, and hydraulic ports defined through the valve body for flow therethrough of hydraulic fluid. Each hydraulic port is in fluid communication with the cavity. The spool includes one or more radially oriented fluid control floating lands provided thereon. Each floating land is coaxial with the spool. Each floating land is configured to control one or more of: fluid flow from a hydraulic port, and fluid flow to a hydraulic port. Each floating land includes a cylindrical control slide defining a hollow chamber that is open at both ends, and an end section. The control slide is axially movable relative to the end section between a retention position and an extension position to thereby control one or more of fluid flow from the hydraulic port, and fluid flow to the hydraulic port. An end section facing side of the control slide defines radially spaced grooves for permitting hydraulic fluid flow from an auxiliary hydraulic fluid pumping system therethrough and into the hollow chamber of the control slide to thereby move the control slide away from the retention position to the extension position.

According to at least one embodiment, the hydraulic ports comprise: a supply port in fluid communication with a hydraulic fluid pumping system; a first return port in fluid communication with the hydraulic fluid pumping system; a first work port in fluid communication with a hydraulically operated piston or device; a second work port in fluid communication with the hydraulically operated piston or device; and, an auxiliary hydraulic port.

According to at least one embodiment, the auxiliary hydraulic port is a metering port in fluid communication with an auxiliary hydraulic fluid pumping system, wherein a first volume of fluid flow from the auxiliary hydraulic fluid pumping system moves the control slide to a first distance from the end section, and a second volume of fluid flow greater than the first volume of fluid flow from the auxiliary hydraulic fluid pumping system moves the control slide to a second distance greater than the first distance from the end section.

According to at least one embodiment, each floating land further comprises a biasing member provided within the hollow chamber of the floating land, the biasing member configured for returning the control slide to the retention position when a hydraulic fluid flow volume or flow rate to the hollow chamber of the floating land drops below a predetermined value.

According to at least one embodiment, each floating land further comprises a circumferential rim extending into the chamber provided near the end section facing side of the control slide, and a cap positioned at an end of the control slide opposite the end section facing side of the control slide, wherein the biasing member spans a space between the cap and the circumferential rim.

According to at least one embodiment, the spool further comprises a spool element that screws into the end section of the floating land.

According to at least one embodiment, metered adjustment of one or more of a hydraulic fluid volume and a hydraulic fluid flow rate delivered to the metering port causes delivery of hydraulic fluid to a hydraulic work area.

According to at least one embodiment, the hydraulic work area is a hydraulic cylinder-piston arrangement.

The present disclosure further describes methods that relate to a hydraulic valve assembly. According to various embodiments of the presently disclosed subject matter, the method of operating a hydraulic valve assembly comprises providing a hydraulic valve assembly. The hydraulic valve assembly comprises: a valve body having a cylindrical internal cavity, and an axially moveable cylindrical spool supported within the cavity. Hydraulic ports are defined through the valve body for flow therethrough of hydraulic fluid, each hydraulic port in fluid communication with the cavity. The spool includes one or more radially oriented fluid control floating lands provided thereon. Each floating land is coaxial with the spool. Each floating land is configured to control one or more of: fluid flow from a hydraulic port, and fluid flow to a hydraulic port. Each floating land includes a cylindrical control slide defining a hollow chamber that is open at both ends, and an end section. The control slide is axially movable relative to the end section between a retention position and an extension position to thereby control one or more of fluid flow from the hydraulic port, and fluid flow to the hydraulic port. An end section facing side of the control slide defines radially spaced grooves for permitting hydraulic fluid flow from an auxiliary hydraulic fluid pumping system therethrough and into the hollow chamber of the control slide to thereby move the control slide away from the retention position to the extension position. The method further comprises delivering hydraulic fluid from the auxiliary hydraulic fluid pumping system into the hollow chamber of the control slide, and moving the control slide away from the retention position to the extension position to control or meter fluid flow from the hydraulic port or fluid flow to the hydraulic port.

According to at least one embodiment, the method further comprises supplying the first volume of fluid flow from the auxiliary hydraulic fluid pumping system to move the control slide to the first distance.

According to at least one embodiment, the method further comprises applying the second volume of fluid flow from the auxiliary hydraulic fluid pumping system to move the control slide to the second distance.

According to at least one embodiment, the method further comprises supplying the first volume of fluid flow from the auxiliary hydraulic fluid pumping system to move the control slide to the first distance to thereby regulate or control fluid flow from at least one hydraulic port or to at least one hydraulic port.

According to at least one embodiment, metered adjustment of one or more of a hydraulic fluid volume and a hydraulic fluid flow rate delivered to the metering port causes delivery of hydraulic fluid to a hydraulic work area, wherein the method further comprises adjusting one or more of the hydraulic fluid volume and the hydraulic fluid flow rate delivered to the metering port to deliver hydraulic fluid to a hydraulic work area.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Figure 1:
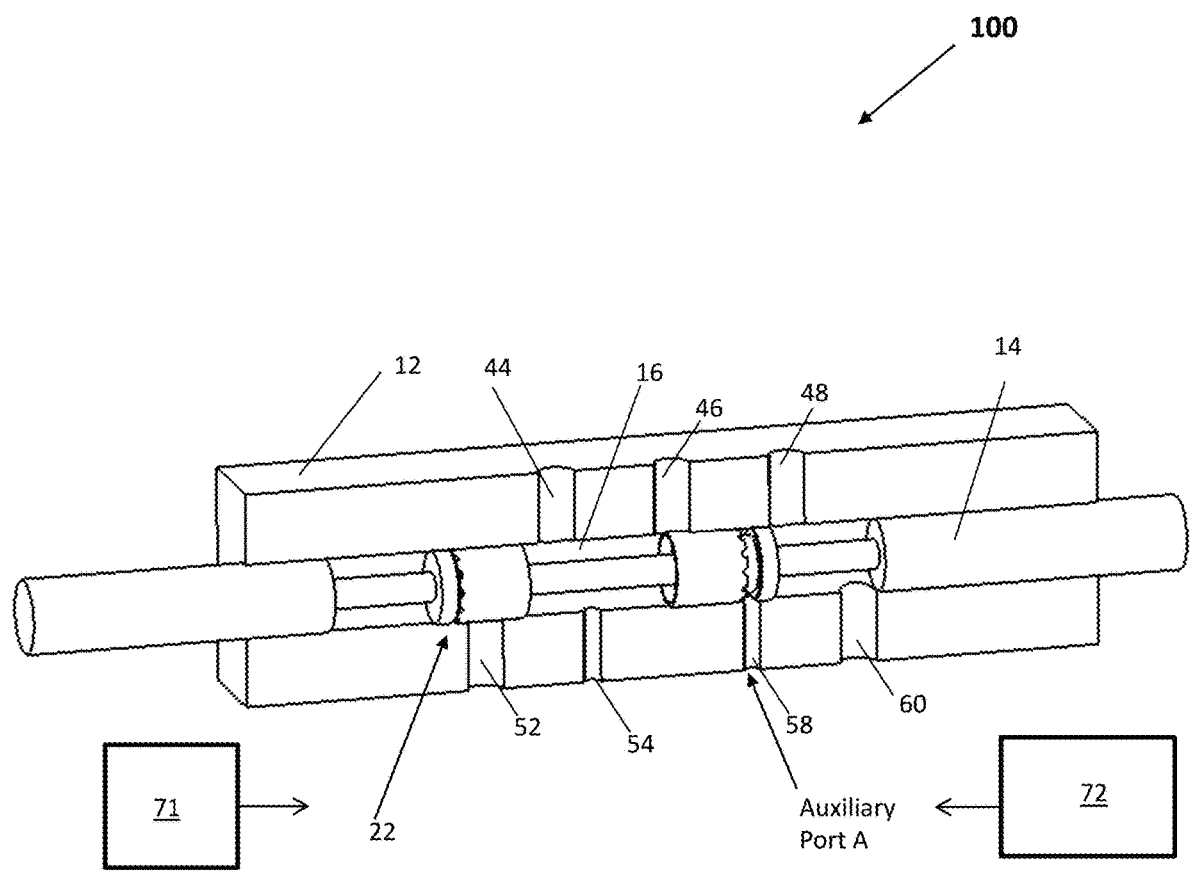
FIG. 1 illustrates a perspective view of a hydraulic valve assembly system with control slide near auxiliary port A partially activated, according to one or more embodiments of the presently disclosed subject matter.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the presently disclosed subject matter provide for a hydraulic valve assembly that advantageously provides for metered adjustment of one or more of hydraulic fluid flow to a hydraulic work area such as a hydraulic cylinder-piston arrangement. Embodiments described herein provide for a hydraulic valve assembly that can advantageously fit into existing hydraulic system set-ups with no major rework requirements. Embodiments disclosed herein provide for an auxiliary port for controlling a control slide to move between a retention position and an extension position to thereby regulate, control or adjust (e.g., block 100%, 50%, 0% or any other percentage between 0% and 100%) flow of hydraulic fluid from or to a hydraulic port.

Figure 2A:
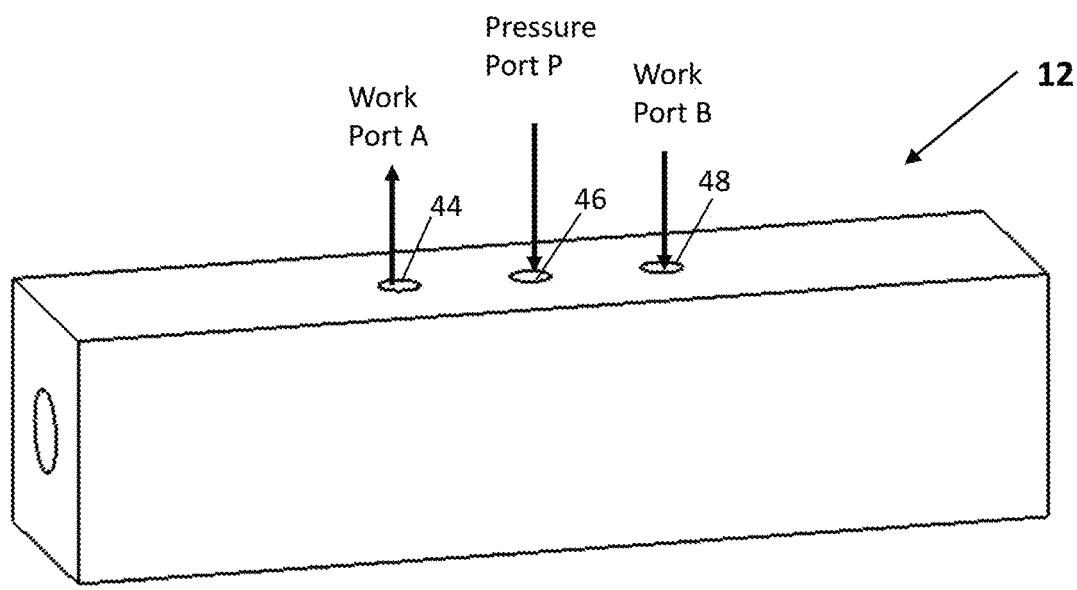
FIG. 2A illustrates a perspective view of a valve body of a hydraulic valve assembly system.
Figure 2B:
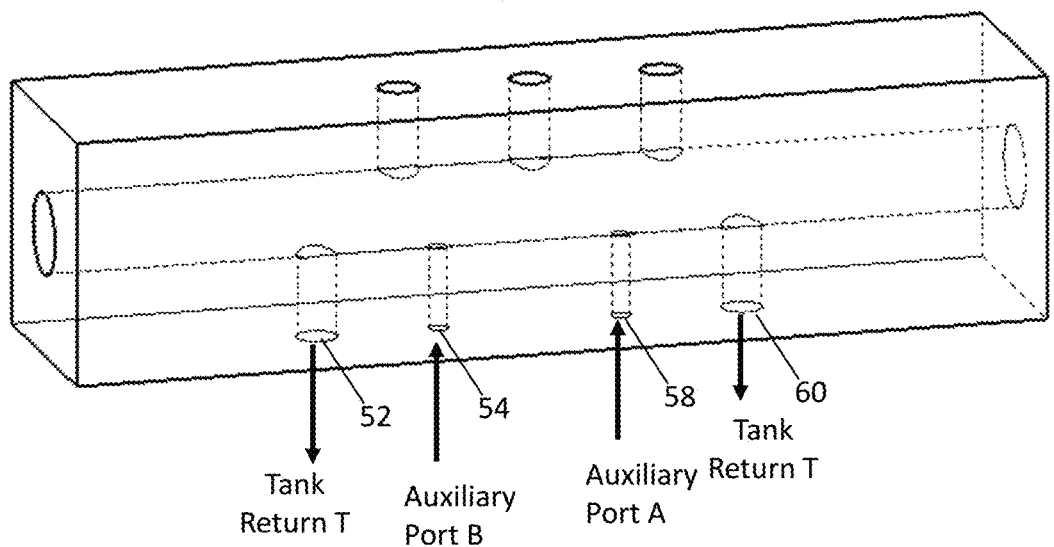
FIG. 2B illustrates a transparent perspective view of the valve body.
Figure 2C:
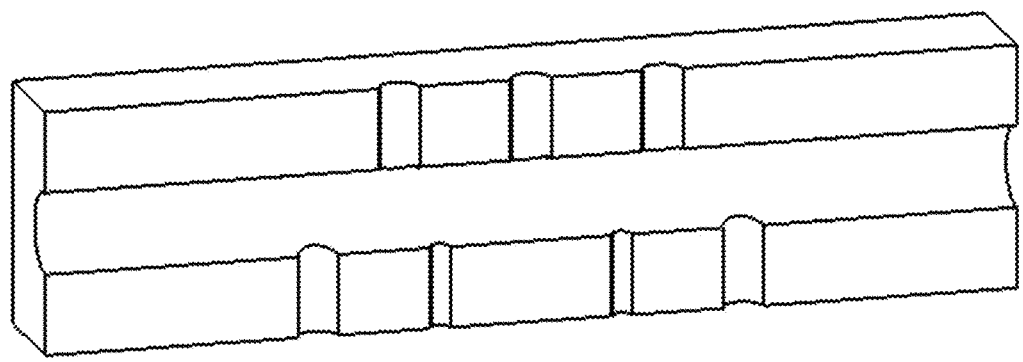
FIG. 2C illustrates a cross-sectional perspective view of the valve body, according to one or more embodiments of the presently disclosed subject matter.
Figure 3A:
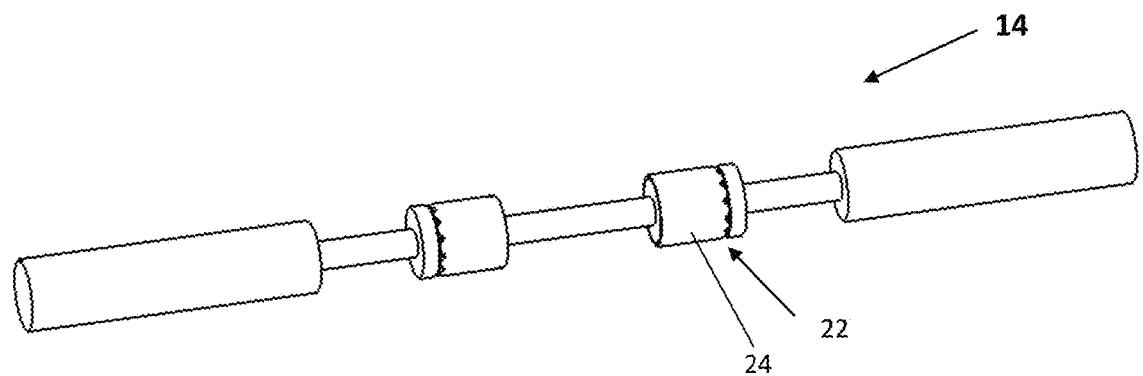
FIG. 3A, FIG. 3B and FIG. 3C illustrate perspective views of a spool of a hydraulic valve assembly system or a portion of thereof, according to one or more embodiments of the presently disclosed subject matter.
Figure 3B:
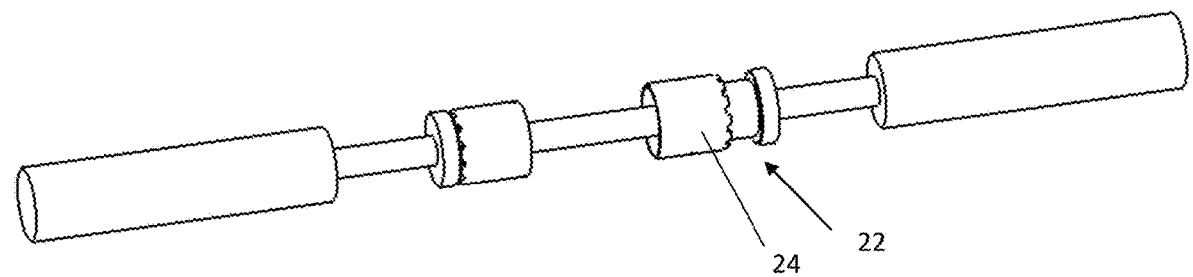
Figure 3C:
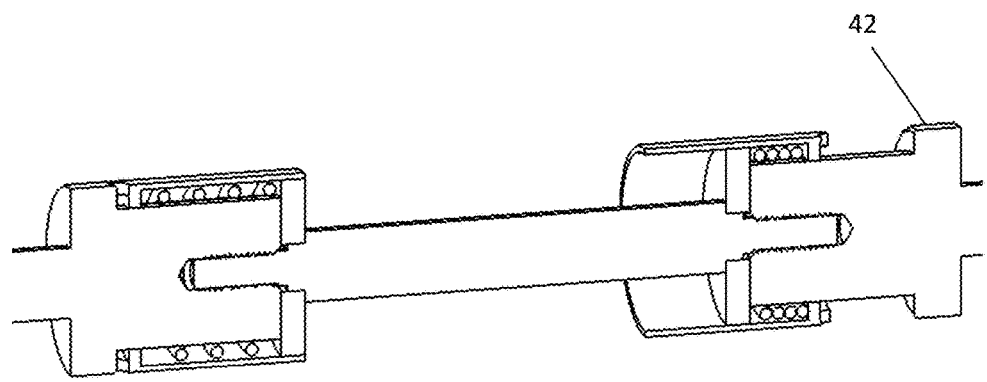

Referring now to FIGS. 1 and 2, a hydraulic control valve assembly such as hydraulic valve assembly 100 (alternately referred to as "assembly 100" or simply "assembly") is provided herein, according to one or more embodiments of the presently disclosed subject matter. Assembly 100 includes a valve body 12. Valve body 12 includes cylindrical internal cavity 16. Assembly 100 also includes ports 44, 46, 48, 52, 54, 58 and 60 defined through valve body 12 for flow therethrough of hydraulic fluid. Each of ports 44, 46, 48, 52, 54, 58 and 60 is in fluid communication with cavity 16. FIG. 2A illustrates a perspective view of valve body 12. FIG. 2B illustrates a transparent perspective view of valve body 12. FIG. 2C illustrates a cross-sectional perspective view of valve body 12. In various embodiments, valve body 12 defines several hydraulic ports such as, for example, port 46 operating as pressure port P for supplying hydraulic fluid from hydraulic fluid pump 71, port 44 operating as a work port A (alternately referred to as a cylinder port), port 48 operating as a work port B, port 52 operating as a tank return T, port 54 operating as an auxiliary port B, port 58 operating as an auxiliary port A, and port 60 operating as an a tank return T.

According to at least one embodiment, hydraulic valve assembly 100 further includes an axially moveable cylindrical spool 14 supported within cavity 16. As shown in FIG. 1, FIG. 3A, FIG. 3B and FIG. 3C, spool 14 fits into cylindrical internal cavity 16 of valve body 12. Spool 14 includes one or more radially oriented fluid control floating lands 22 provided thereon. Each floating land 22 is coaxial with spool 14. Each floating land 22 is configured to control, regulate or block one or more of fluid flow from a hydraulic port(s), and fluid flow to a hydraulic port(s). Floating land 22 includes a cylindrical control slide 24 defining a chamber that takes the shape of a hollow cylinder that is open at both ends thereof, and an end section 42. Control slide 24 of floating land 22 is axially movable relative to the end section between a retention position (as shown, for example, in FIG. 3A) and an extension position (as shown, for example, in FIG. 3B) to thereby control one or more of fluid flow from, and fluid flow to, ports 44, 46, 48, 52 and 60 (i.e., to ports other than the auxiliary ports). Control slide 24 is configured for sliding in and out of end section 42.

Figure 8:
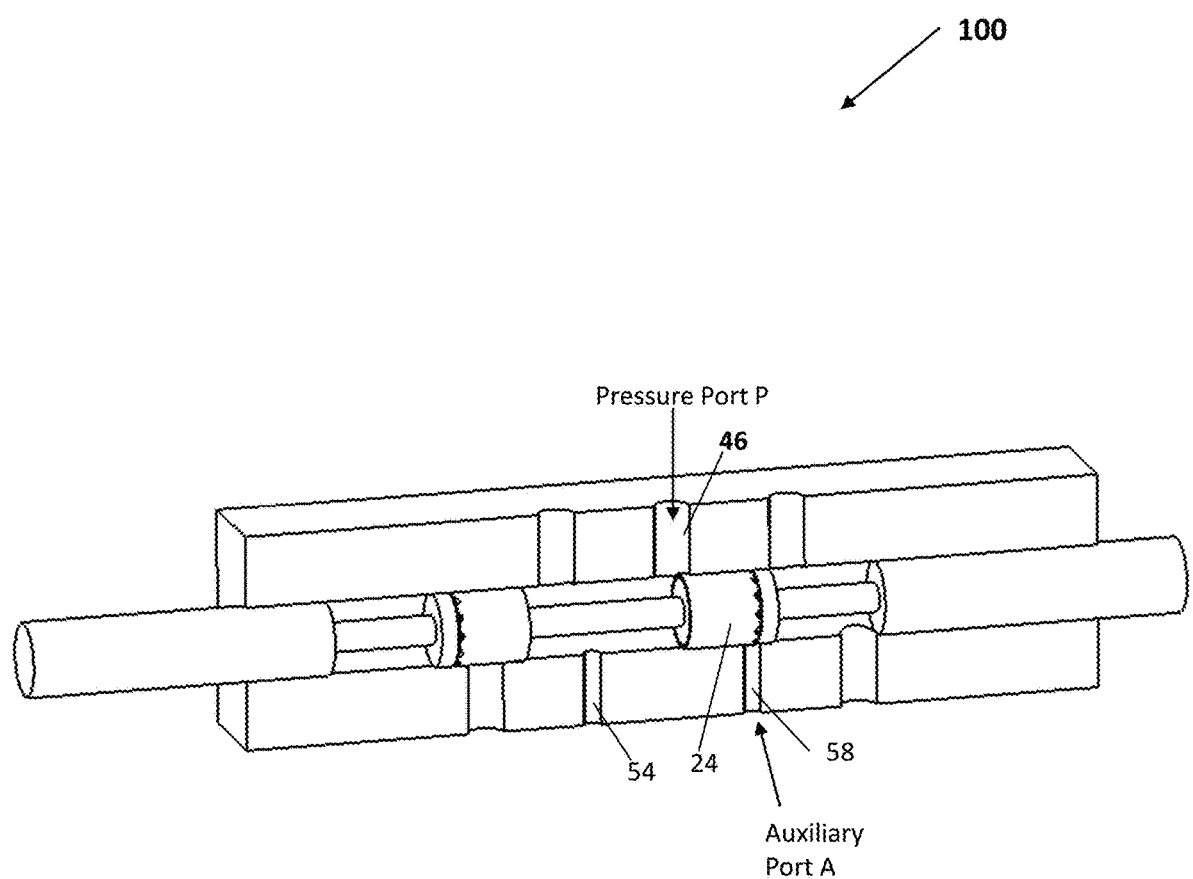
FIG. 8 illustrates a perspective views of a hydraulic valve assembly system with floating land near auxiliary port A in a retention position, according to one or more embodiments of the presently disclosed subject matter.
Figure 9:
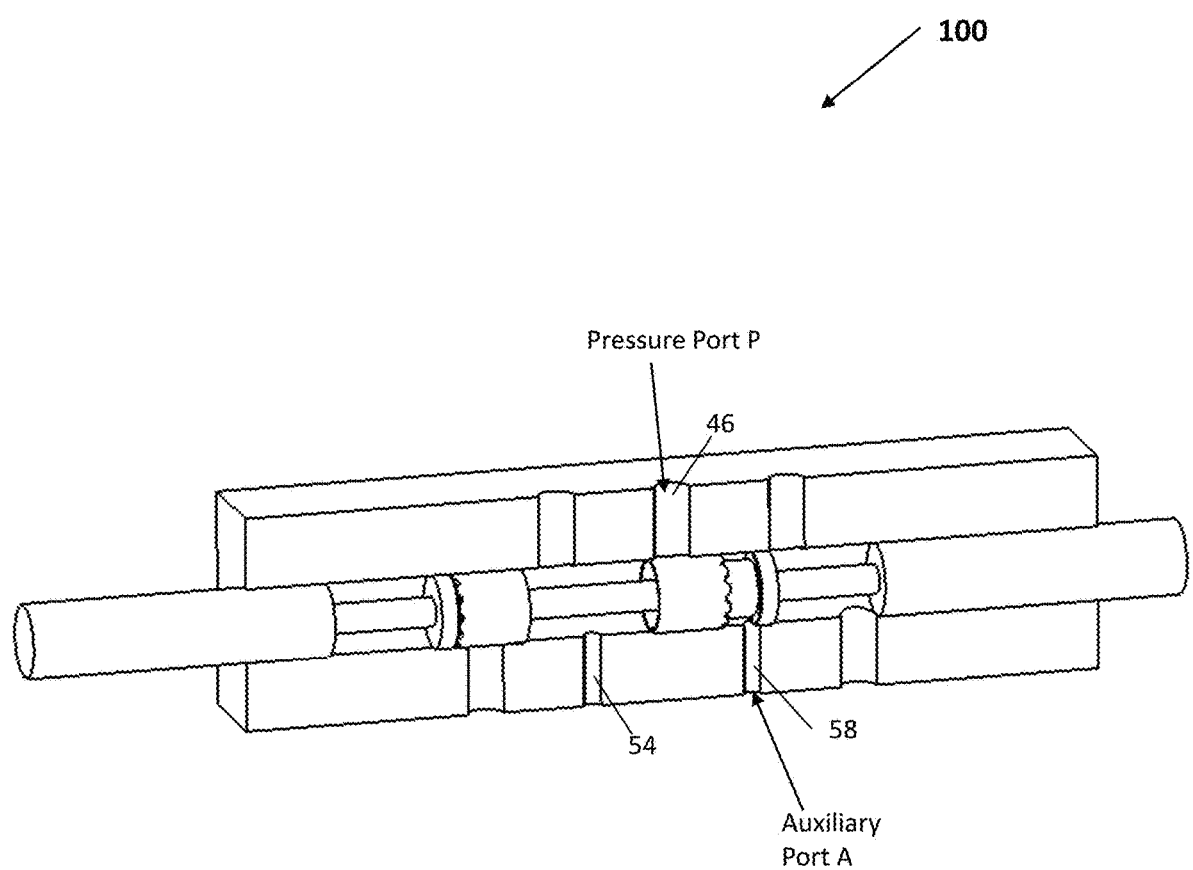
FIG. 9 illustrates a perspective views of a hydraulic valve assembly system with the floating land near auxiliary port A in an extension position with a pressure port P blocked, according to one or more embodiments of the presently disclosed subject matter.

FIG. 8 illustrates floating land near the port 58 (i.e., near the port marked as auxiliary port A) in a retention position whereby pressure port is not blocked. FIG. 9 illustrates control slide 24 near auxiliary port A in an extension position whereby auxiliary port A is opened, which in turn results in pressure port P being blocked either completely or partially. In various embodiments, hydraulic fluid pump 71 forms part of a hydraulic fluid pumping system that includes assembly 100. During operations, liquid from hydraulic fluid pump 71 flows to port 46 (additionally labeled as "Pressure Port P" in FIG. 2A), while hydraulic fluid returns to a reservoir, tank or to the suction side of hydraulic fluid pump 71 via one or more of tank return port such as port 52 and port 60 (additionally labeled as "Tank Return T" in FIG. 2B). Hydraulic fluid entering port 46 can travel through port 44 (additionally labeled as "Work Port A" in FIG. 2A) to a hydraulically operated piston or device; further, after performing work at the hydraulically operated piston or device, hydraulic fluid return to cylindrical internal cavity 16 of valve body 12 via port 48 (additionally labeled as "Work Port B" in FIG. 2A).

According to one embodiment, an operator, using a control mechanism, can control hydraulic valve assembly 100 by varying the hydraulic flow volume or flow rate supplied to an auxiliary port. Increasing the fluid flow rate and/or providing fluid flow volume to an auxiliary port operates to bias a predetermined control slide to move from a retentions position towards an extension position thereby causing to regulate or control fluid flow from or to a port such as port 46 (i.e., pressure port P). Controlling or regulating fluid flow from port 46 can correspondingly result in causing fluid flow through port 44 to a cylinder-piston arrangement of the hydraulic work element that is in fluid connection with port 44. The fluid may return to cavity 16 through port 48, and subsequently flow out of cavity 16 through port 52 and/or port 58.

Accordingly, based on the positioning of spool 14 and a control slide 24, hydraulic fluid can be configured to flow and pressurize and depressurize different sides of cylinder-piston via hydraulic lines connected to the work port pair comprising work port A (port 44) and work port B (port 48). In this way, a differential pressure can be created across a work element to affect the desired result, e.g., raising a skid steer loader bucket. In some embodiments, a sensor is coupled to cylinder-piston for sensing a desired parameter and providing a sensor signal indicative of the desired parameter.

In some embodiments, each control slide 24 can be configured to lock up one, two, three or more posts at the same time and thereby operate as an ON-OFF valve for the one, two, three or more posts. Spool 14 may be either integral with or non-integral with the monolithic valve body.

In one embodiment, spool 14 may be operated under control of a single or two solenoid valves. In one embodiment, spool 14 may have a 16 mm maximum diameter.

In various embodiments, the hydraulic ports provided on valve body 12 can include a pressure port P (e.g., port 46) in fluid communication with hydraulic fluid pump 71, one or more tank return T ports (e.g., port 52 and port 60) in fluid communication with hydraulic fluid pump 71, a first work port A in fluid communication with the supply side a hydraulically operated piston (e.g., port 44), a second work port B in fluid communication with the discharge side of the hydraulically operated piston (e.g., port 48), and one or more auxiliary hydraulic ports (e.g., port 54 and port 58). The hydraulic fluid pumping system includes hydraulic fluid pump 71 configured for supplying hydraulic fluid from a discharge end of hydraulic fluid pump 71 to port 46; hydraulic fluid pump 71 is further configured to receive hydraulic fluid from port 52 and port 60 at a suction end of hydraulic fluid pump 71. In some embodiment, a hydraulic fluid tank receives hydraulic fluid from port 52 and port 60, wherein at a suction end of hydraulic fluid pump 71 is fluid communication with the hydraulic fluid tank.

In various embodiments, each auxiliary hydraulic port is in fluid communication with auxiliary hydraulic fluid pump 72 of an auxiliary hydraulic fluid pumping system. In some embodiments, each auxiliary hydraulic port is in fluid communication with an accumulator forming part of the auxiliary hydraulic fluid pumping system. In one or more embodiments, the auxiliary hydraulic fluid pumping system can include an accumulator in addition to, or in lieu of, the auxiliary hydraulic fluid pump 72. According to at least one embodiment, the auxiliary hydraulic fluid pumping system thus includes an auxiliary hydraulic fluid pump 72 configured for supplying hydraulic fluid from a discharge end of auxiliary hydraulic fluid pump 72 to auxiliary hydraulic ports 54, 54A, 58 and 58A. Auxiliary hydraulic fluid pump 72 may be further configured to receive hydraulic fluid from auxiliary hydraulic ports 54, 54A, 58 and 58A at a suction end of auxiliary hydraulic fluid pump 72.

Figure 4:
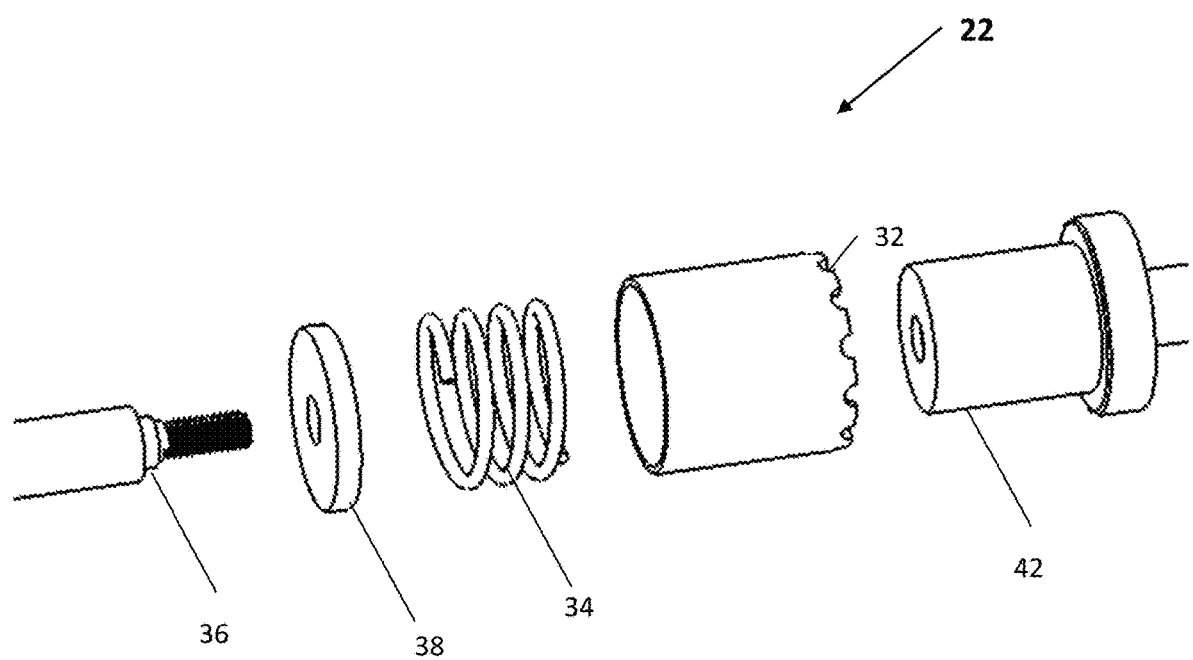
FIG. 4 illustrates an exploded perspective view of a floating land of a hydraulic valve assembly system, according to one or more embodiments of the presently disclosed subject matter.

FIG. 4 illustrates an exploded perspective view of floating land 22, according to one or more embodiments of the presently disclosed subject matter. As illustrated in FIG. 4, an end section facing side of the control slide defines radially spaced grooves 32 for permitting hydraulic fluid flow therethrough and into the chamber formed by control slide 24 to thereby move control slide 24 away from a retention position as shown, for example, in FIG. 3A (see control slide 24 on the right side) to an extension position as shown, for example, in FIG. 3B (see control slide 24 on the right side). In at least one embodiment, floating land 22 further comprises a biasing member 34 housed within the chamber formed by the major inner surface of control slide 24. Biasing member 34 is configured for returning control slide 24 to the retention position when fluid flow rate or fluid flow volume to the chamber of control slide 24 drops below a predetermined value (e.g., 0.5 cubic centimeter or less) as shown, for example, in FIG. 3A; see control slide 24 on the right side. In one embodiment, biasing member 34 is configured as a spring. However, in other embodiments, the biasing member can take other forms such as, for example, a bent tensile strip. In various embodiments, floating land 22 can further include a circumferential rim 62 (see FIG. 6B) extending into the chamber of control slide 24, with circumferential rim 62 positioned near the end section 42 facing side of control slide 24. Floating land 22 also includes a lid such as cap 38 positioned at an end of control slide 24 opposite to the end section facing side of control slide 24. In at least one embodiment, biasing member 34 spans a length between cap 38 and the circumferential rim 62. Cap 38 is not attached to control slide 24 whereby control slide 24 slides across 38 between a retention position and an extension position. Biasing member 34 is loaded or positioned within the chamber of control slide 24 and abuts, at one end, an upper interior surface of cap 38.

Figure 5:
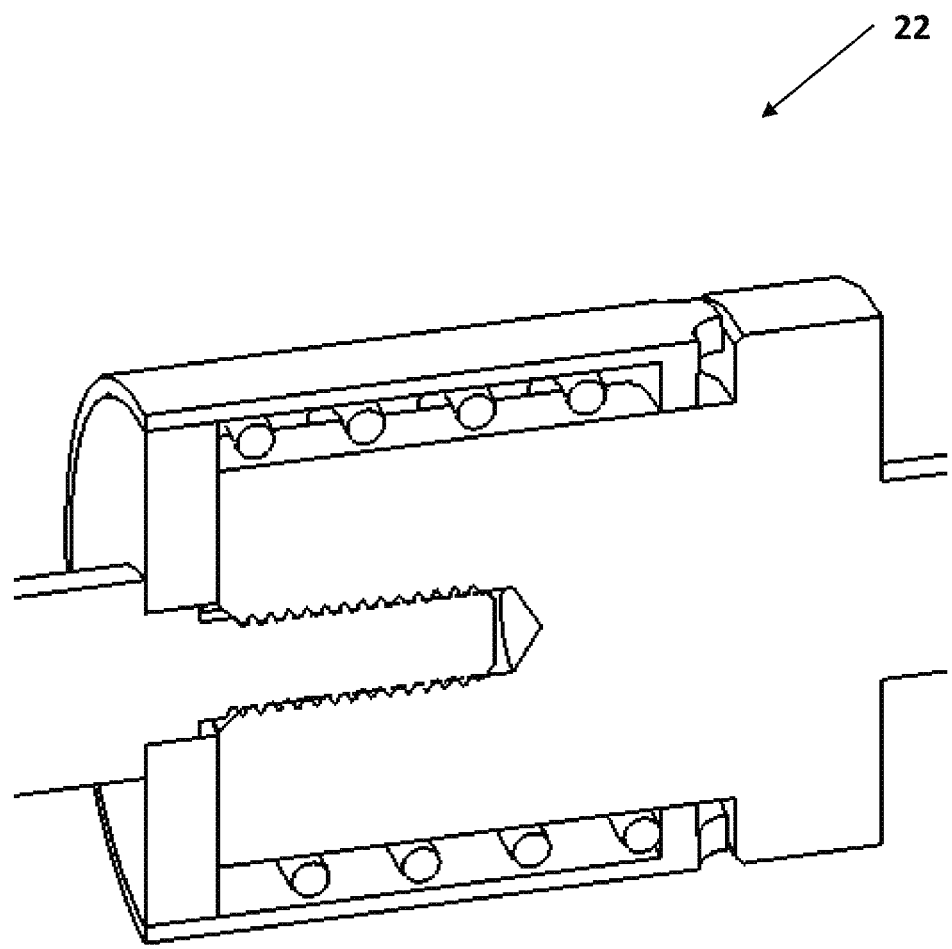
FIG. 5 illustrates a cross-sectional perspective view of a portion a floating land of a hydraulic valve assembly system, according to one or more embodiments of the presently disclosed subject matter.
Figure 6A:
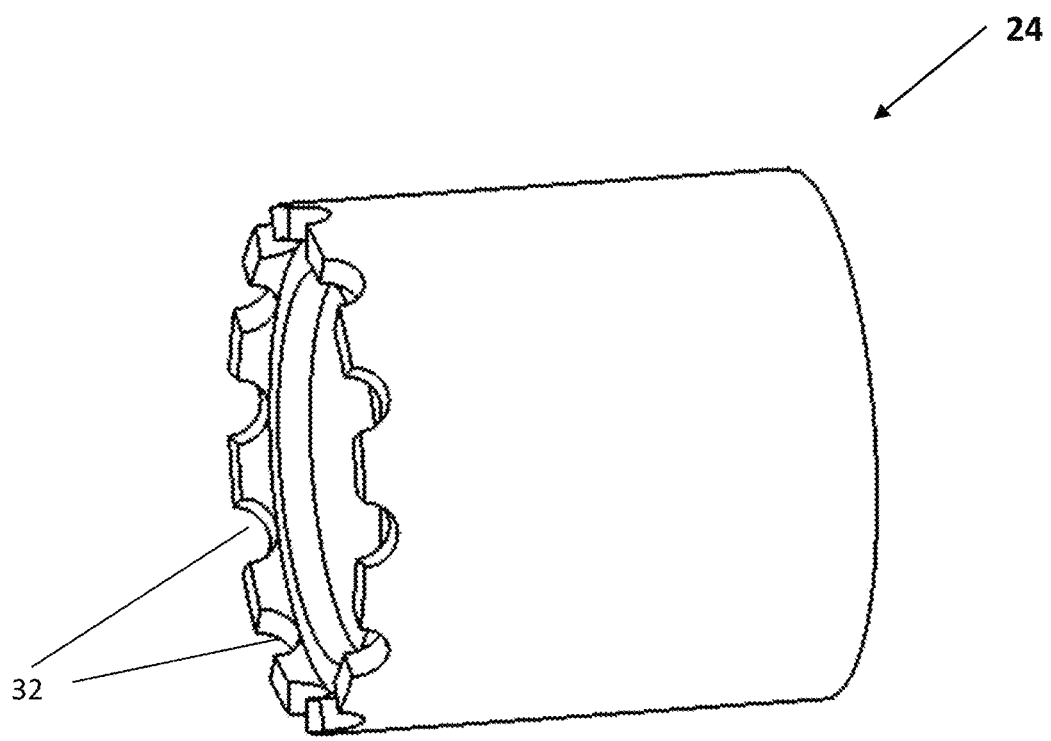
FIG. 6A illustrates a perspective view of a control slide of a floating land of a hydraulic valve assembly system.
Figure 6B:
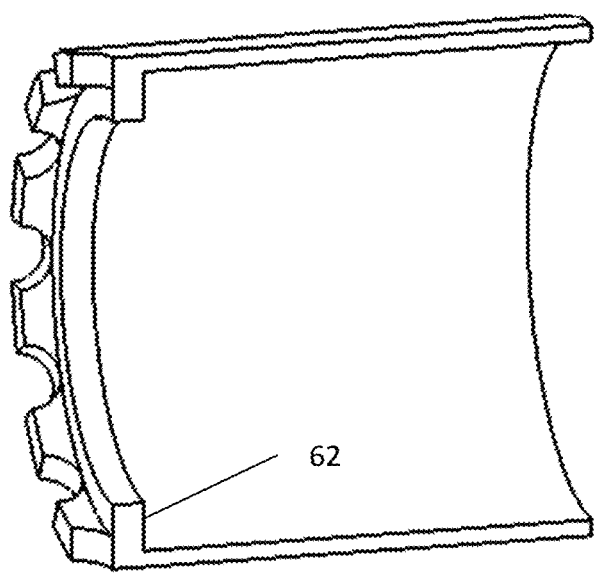
FIG. 6B illustrates a cross-sectional perspective view of the control slide, according to one or more embodiments of the presently disclosed subject matter.

FIG. 5 illustrates a cross-sectional perspective view of a portion of floating land 22 of hydraulic valve assembly 100, according to one or more embodiments of the presently disclosed subject matter. As illustrated in FIG. 5 and in FIG. 3C, spool 14 can further include a spool element 36 that screws into end section 42 of floating land 22. FIG. 6A illustrates a side perspective view of control slide 24 of floating land 22, and FIG. 6B illustrates a cross-sectional perspective view of control slide 24. As illustrated in FIG. 6B, circumferential rim 62 extends into the chamber of control slide 24 provided near the end section 42 facing side of control slide 24. Circumferential rim 62 provides a support space or ledge for biasing member 34.

Figure 7A:
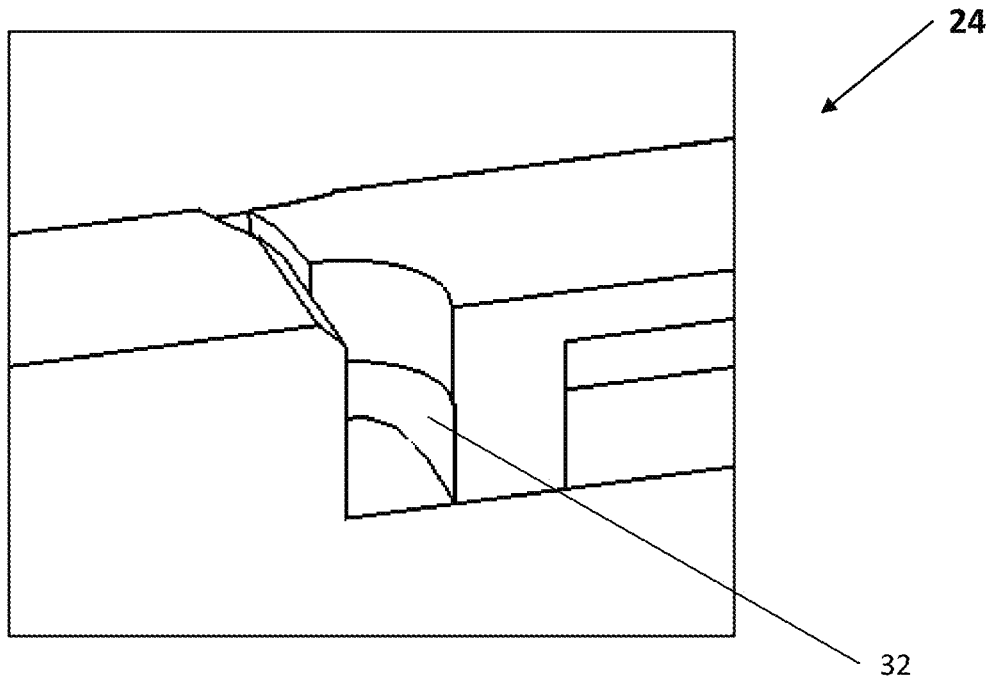
FIG. 7A and FIG. 7B illustrate perspective views of a portion of a floating land of a hydraulic valve assembly system, according to one or more embodiments of the presently disclosed subject matter.
Figure 7B:
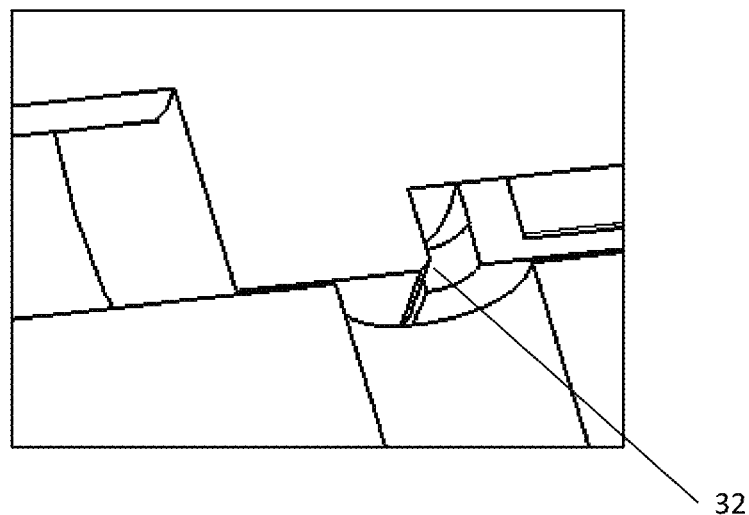

FIG. 7A and FIG. 7B illustrate perspective views of a portion of a floating land 22 including a plurality of grooves 32. In at least one embodiment, a plurality of groove 32 are radially spaced along a circumference of control slide 24 for permitting hydraulic fluid flow therethrough and into chamber of control slide 24 to thereby move control slide 24 away from the retention position to the extension position. Accordingly, each groove 32 is configured for permitting flow of hydraulic fluid therethrough. In at least one embodiment, each radially spaced groove 32 can have a curved contour or a semi-circular contour as illustrated in FIG. 7A and FIG. 7B. However, the shape of groove 32 is not limited by the above-mentioned shapes and groove 32 can have any other suitable shape (e.g., semi-oval, etc.) as a person of skill in the art will readily understand.

FIG. 8 illustrates an embodiment of hydraulic valve assembly 100 with control slide 24 of floating land 22 located closest to auxiliary port A (i.e., port 58) in a retention position. As illustrated in FIG. 8, when control slide 24 is in the retention position, control slide 24 permits 100% flow of hydraulic fluid through pressure port P (i.e., port 46); stated differently, when control slide 24 is in the retention position, control slide 24 does not block flow of hydraulic fluid through pressure port P (i.e., port 46). By contrast, FIG. 9 illustrates the same embodiment with control slide 24 (of floating land 22) that is located closest to auxiliary port A in an extension position whereby hydraulic fluid flow from pressure port P (i.e., port 46) is 100% blocked.

Figure 10A:
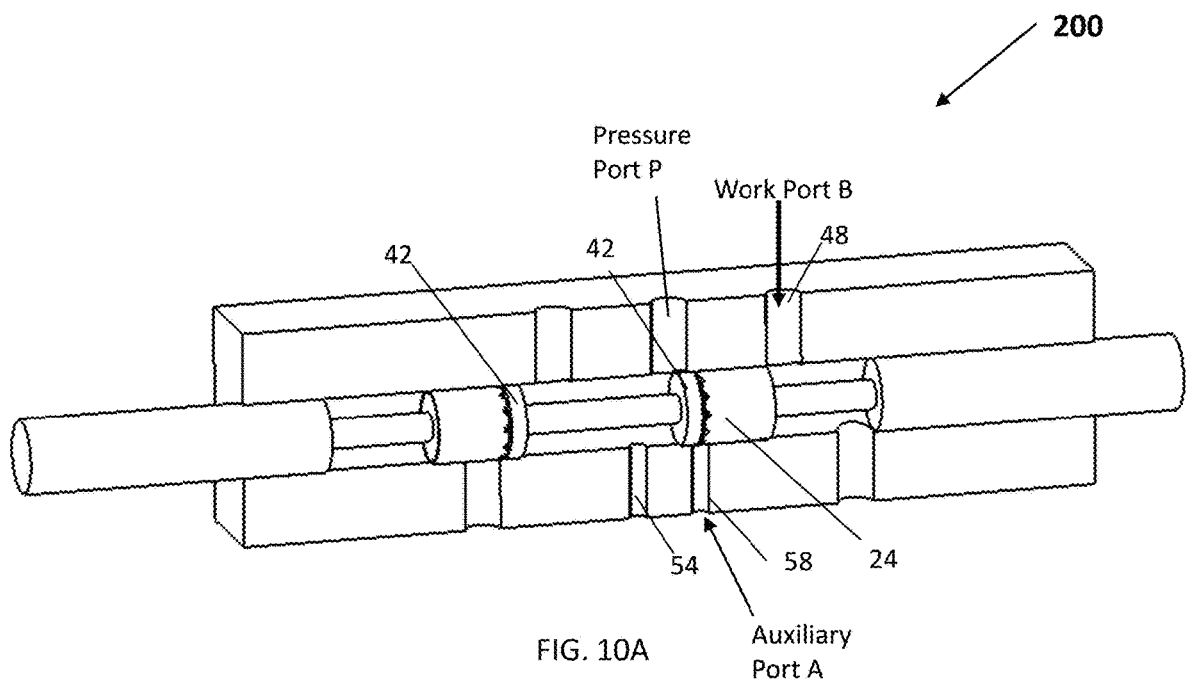
FIG. 10A illustrates a perspective views of a hydraulic valve assembly system with both floating lands in retention position.
Figure 10B:
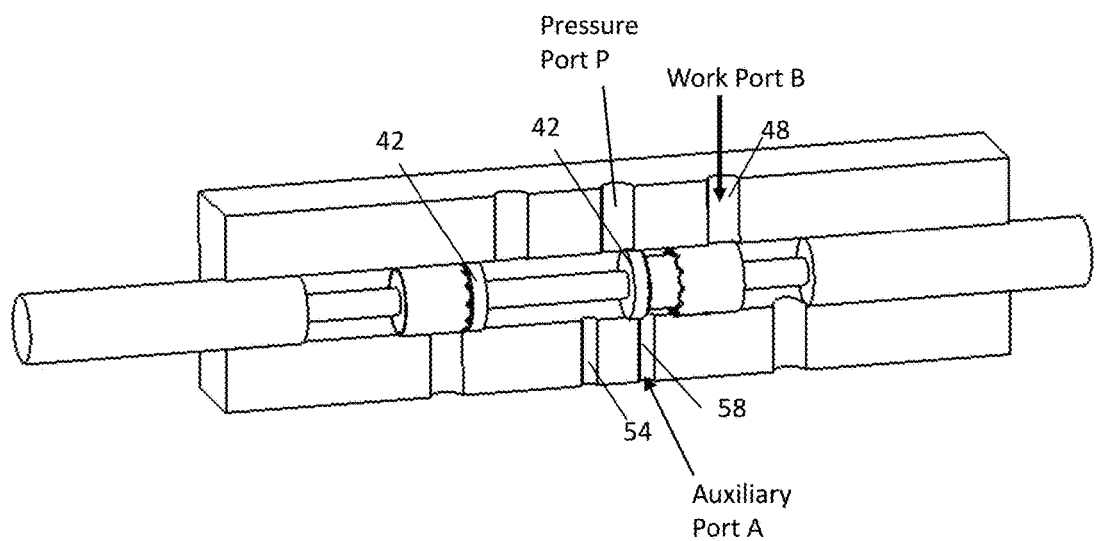
FIG. 10B illustrates floating land near auxiliary port A in an extension position and tank return blocked, according to one or more embodiments of the presently disclosed subject matter.

FIG. 10A and FIG. 10B illustrate a hydraulic valve assembly 200 wherein the end sections 42 of adjacent floating land 22 face each other, according to at least one embodiment. Accordingly, as illustrated in FIG. 10A, port 54 and port 58 are positioned closer to each other in hydraulic valve assembly 200 as compared to hydraulic valve assembly 100. Hydraulic valve assembly 200 may otherwise share similar or identical features with hydraulic valve assembly 100. In the FIG. 10A embodiment, control slide 24 of floating land 22 located closest to auxiliary port A (i.e., port 58) is in a retention position. According to the embodiment as illustrated in FIG. 10A, when control slide 24 is in the retention position, control slide 24 allows 100% flow of hydraulic fluid through pressure port P (i.e., port 46); stated differently, when control slide 24 is in the retention position, control slide 24 does not block flow of hydraulic fluid through pressure port P (i.e., port 46). By contrast, FIG. 10B illustrates control slide 24 (of floating land 22) that is located closest to auxiliary port A in an extension position whereby hydraulic fluid flow from work port B back to the tank is blocked; in other words, FIG. 10B illustrates the return to tank being metered.

Figure 11A:
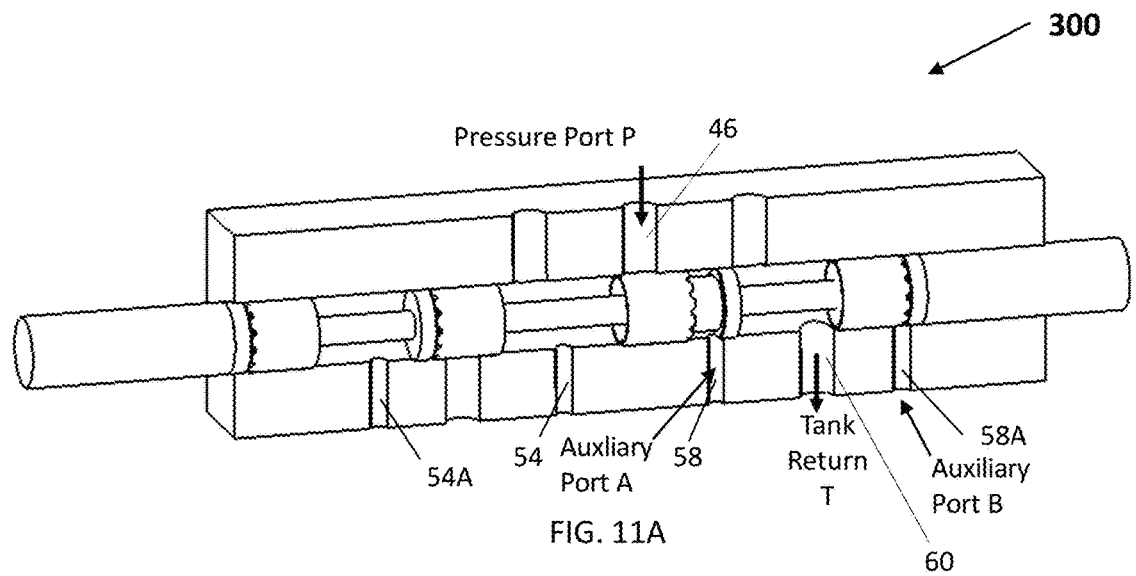
FIG. 11A illustrates a perspective views of a hydraulic valve assembly system with a control slide near auxiliary port A in an extension position while control slide near auxiliary port B is in a retention position.
Figure 11B:
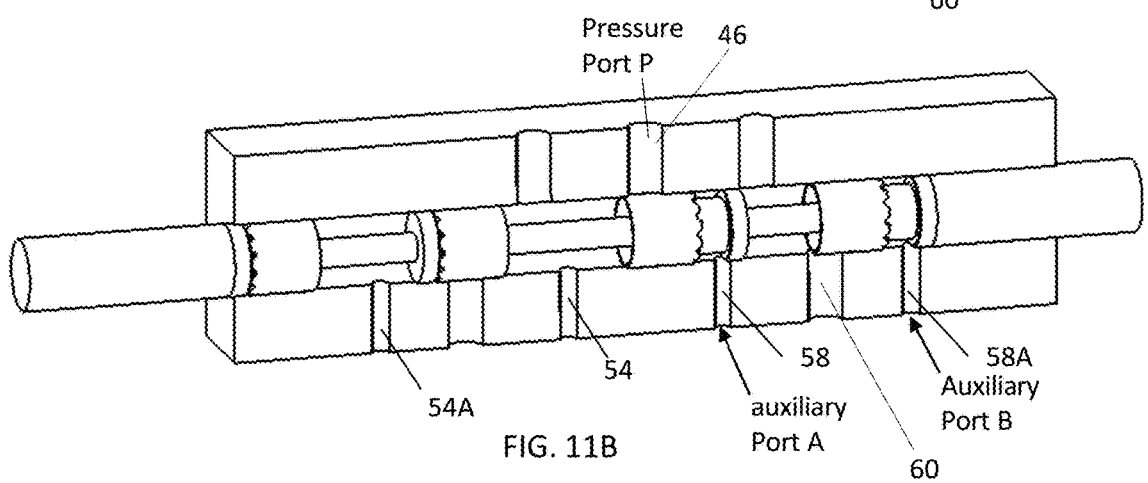
FIG. 11B illustrates control slide near auxiliary port A in an extension position while control slide near auxiliary port B is in an extension position.
Figure 11C:
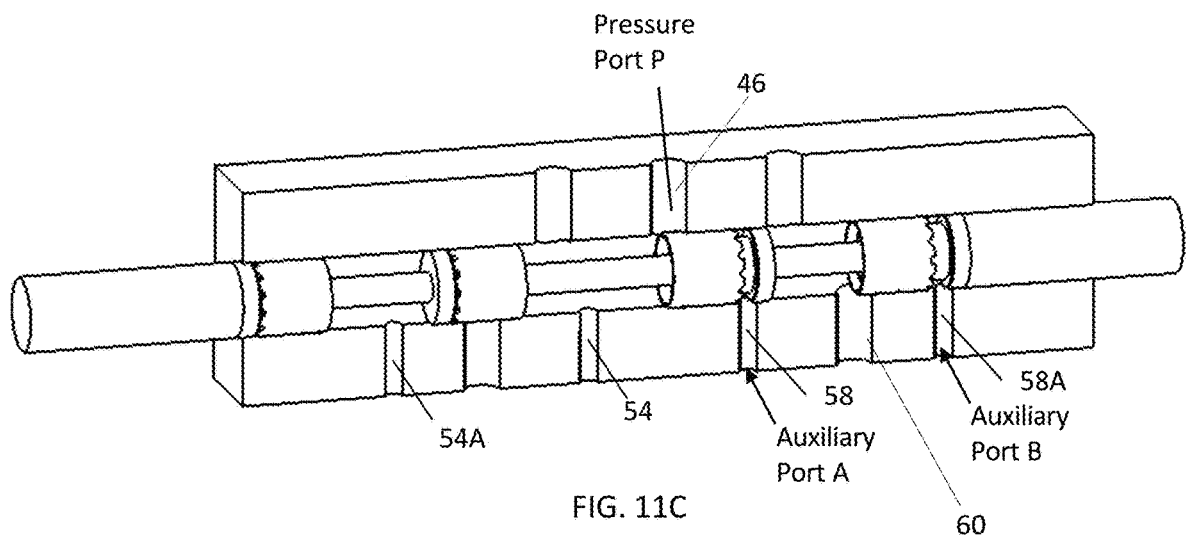
FIG. 11C illustrates control slide near auxiliary port A in a partial extension position while control slide near auxiliary port B is in a partial extension position.

FIG. 11A, FIG. 11B and FIG. 11C illustrate a hydraulic valve assembly 300 that includes four floating lands 22, according to at least one embodiment. Hydraulic valve assembly 300 is configured for metering of fluid flow entering cavity 16 through pressure port P. In hydraulic valve assembly 300, end sections 42 of a first set of contiguous floating lands 22 face in a first direction whereas end sections 42 of a second set of contiguous floating lands face in a second direction opposite the first direction. Hydraulic valve assembly 300 is configured for one or more of its control slides 24 providing partial extension configurations in addition to full extension configurations whereby each of auxiliary hydraulic ports 54, 54A, 58 and 58A can operate as a metering port wherein the distance by which each control slide 24 slides from its retention position towards its extension position can be adjusted by adjusting a flow volume or flow rate supplied to the chamber of the control slide 24 of an associated auxiliary hydraulic port 54, 54A, 58 or 58A as illustrated, for example, in FIG. 11C.

FIG. 11C illustrates hydraulic valve assembly 300 with a third control slide 24 from the left in partially extended position wherein a first volume of fluid flow (e.g., 3 cubic centimeters) from the auxiliary hydraulic fluid pumping system moves the third control slide 24 to a first distance (e.g., 5 mm) from the end section whereby supply port P (i.e., port 46) is partially opened (e.g., 50% blocked) for hydraulic fluid flow therethrough. FIG. 11C further illustrates a fourth control slide 24 from the left in a partially extended position wherein a first volume of fluid flow (e.g., 3 cubic centimeters) from the auxiliary hydraulic fluid pumping system moves the fourth control slide 24 to a first distance (e.g., 5 mm) from the end section whereby port 60 (i.e., tank return T as marked in FIG. 11A) is partially opened (e.g., 50% opened) for hydraulic fluid flow therethrough; this causes tank return T to be partially opened (e.g., 50% blocked) for hydraulic fluid flow therethrough.

FIG. 11A illustrates the third control slide 24 from the left in a fully extended extension position wherein a second volume of fluid flow (e.g., 6 cubic centimeters) greater than a first volume of fluid flow (e.g., 3 cubic centimeters) supplied by the auxiliary hydraulic fluid pumping system moves the third control slide 24 to a second distance (e.g., 10 mm) greater than the first distance (e.g., 5 mm) from the end section whereby port 46 (i.e., pressure port P) is fully blocked (e.g., 100% closed) to thereby prevent flow of hydraulic fluid through port 46 (i.e., pressure port P). FIG. 11A further illustrates the fourth control slide 24 from the left in a retention position wherein a low volume of fluid flow (e.g., less than 1 cubic centimeter such as 0 cubic centimeter) from the auxiliary hydraulic fluid pumping system retains the fourth control slide 24 close to the end section (e.g., 0 mm) whereby port 60 (i.e., tank return T) is completely open (e.g., 100% open) to control or meter flow (i.e., not block the flow) of hydraulic fluid therethrough.

FIG. 11B illustrates a third control slide 24 from the left in a fully extended retention position wherein a second volume of fluid flow (e.g., 6 cubic centimeters) greater than the first volume of fluid flow from the auxiliary hydraulic fluid pumping system moves the third control slide 24 to a second distance (e.g., 10 mm) greater than the first distance from the end section whereby port 46 (i.e., pressure port P) is fully blocked (e.g., 100% closed) to thereby prevent flow of hydraulic fluid through port 46 (i.e., pressure port P). FIG. 11B further illustrates the fourth control slide 24 from the left in a fully extended extension position wherein a second volume of fluid flow (e.g., 6 cubic centimeters) greater than the first volume of fluid flow from the auxiliary hydraulic fluid pumping system moves the fourth control slide 24 to a second distance (e.g., 10 mm) greater than the first distance from the end section whereby port 60 (i.e., tank return T as marked in FIG. 11A) is completely blocked (e.g., 100% closed) to prevent flow of hydraulic fluid through tank return T.

According to at least one embodiment, auxiliary hydraulic fluid pump 72 of the auxiliary hydraulic fluid pumping system is configured for supplying hydraulic fluid from a discharge end of auxiliary hydraulic fluid pump 72 to each auxiliary hydraulic port 54, 54A, 58 and 58A. In at least one embodiment, the auxiliary hydraulic fluid pumping system is configured for delivering four different rate/volume of fluid flows at each respective auxiliary hydraulic port 54, 54A, 58 and 58A. Auxiliary hydraulic fluid pump 72 is further configured to receive hydraulic fluid from auxiliary hydraulic ports 54, 54A, 58 and 58A at a suction end of auxiliary hydraulic fluid pump 72.

In one embodiment, bleeding of fluid present within the chamber of a control slide 24 operates to accomplish the movement of control slide 24 from an extension position to a partially extended position. In one embodiment, bleeding of fluid present within the chamber of control slide 24 operates to accomplish the movement of control slide 24 from the partially extended position to the retentions position. In one embodiment, bleeding of fluid present within the chamber of control slide 24 operates to accomplish the movement of control slide 24 from the extension position to the retention position.

According to various embodiments as disclosed herein, hydraulic fluid flow rate or hydraulic fluid flow volume delivered to chamber of a control slide 24 can be metered. Such metering of fluid flow can advantageously regulate flow of hydraulic fluid to a hydraulic system (e.g., a cylinder) to avoid imbalances such as, for example, undesirable high pressure on one side of the hydraulic system (e.g., the cylinder). According to some embodiments, a system feedback provided as part of assembly 100 can be configured to communicate to an automated actuator that in turn operates to control or regulate fluid flow to the chamber of the control slide 24 at each respective auxiliary hydraulic port 54, 54A, 58 and 58A operating as a metering port when such a balancing need to occur.

With regard to metering, auxiliary port 54 and port 58 of FIG. 1, FIGS. 2A, 2B and 2C, FIG. 8, FIG. 9, FIG. 10A and FIG. 10B are operable as metering ports; similarly, auxiliary port 54, port 54A, port 58 and port 58A of FIG. 11A, FIG. 11B and FIG. 11C are operable as metering ports. In one embodiment, one or more of auxiliary hydraulic ports 54, 54A, 58 and 58A operate as metering ports in fluid communication with an auxiliary hydraulic fluid pumping system of an auxiliary hydraulic fluid pumping system such that a first volume of fluid flow (e.g., 3 cubic centimeters) from the auxiliary hydraulic fluid pumping system moves the control slide 24 to a first distance (e.g., 5 mm) from the end section, and a second volume of fluid flow (e.g., 6 cubic centimeters) greater than the first volume of fluid flow from the auxiliary hydraulic fluid pumping system moves the control slide to a second distance (e.g., 10 mm) greater than the first distance from the end section; further a third volume of fluid flow (e.g., less than 1 cubic centimeter such as 0 cubic centimeters) moves or retains the control slide in the retention position. Accordingly, auxiliary hydraulic ports 54, 54A, 58 and 58A operate as metering ports whereby the level of distance that the control slide travels or slides between a retention position and an extension position can be metered by adjusting or metering the flow rate or flow volume of hydraulic fluid supplied to ports 54, 54A, 58 and 58A.

In various embodiments, metered adjustment of one or more of a hydraulic fluid volume and a hydraulic fluid flow rate delivered to one or more metering ports such as ports 54, 54A, 58 and 58A results in the control, regulating or controlling flow of hydraulic fluid (e.g., block 100% flow, 50% flow, 10% flow, 1% flow, etc. or permit 100% flow, 50% flow, 10% flow, 1% flow, etc.) to a hydraulic work area at a predetermined flow rate range or predetermined flow volume range or a predetermined pressure range. In one embodiment, one or more of the hydraulic fluid volume and a hydraulic fluid flow rate delivered to one or more metering ports such as ports 54, 54A, 58 and 58A can be accomplished by adjusting an operating parameter of auxiliary hydraulic fluid pump 72 forming part of the auxiliary hydraulic fluid pumping system that supplies hydraulic fluid to one or more metering ports such as ports 54, 54A, 58 and 58A. Adjusting one or more of the hydraulic fluid volume and a hydraulic fluid flow rate delivered to one or more auxiliary ports such as ports 54, 54A, 58 and 58A results in ports 54, 54A, 58 and 58A to thereby open ports other than the auxiliary ports to different levels such as 5, 10, 15, 20, 25, 30, 35, 40, 45, 50, 55, 60, 65, 70, 75, 80, 85, 90, 95 or 100% opened/closed, for example. In at least one embodiment, the hydraulic work area to which the hydraulic fluid is delivered via work port A is a hydraulic cylinder-piston arrangement.

According to at least one embodiment, one or more of port 54, port 54A, port 58 and port 58A (i.e., auxiliary hydraulic ports) can operate as a pilot port in fluid communication with the auxiliary hydraulic fluid pump, wherein a first volume of fluid flow (e.g., 3 cubic centimeters or 6 cubic centimeters or any other suitable volume of fluid flow) from the auxiliary hydraulic fluid pumping system moves the control slide to a first distance from the end section to thereby regulate or control fluid flow (e.g., block 100% flow or permit 100% flow) from at least one hydraulic port and/or to at least one hydraulic port.

According to various embodiments, disclosed herein is a method of operating a hydraulic valve assembly. In various embodiments, the method comprises providing a hydraulic valve assembly. The assembly comprises a valve body having a cylindrical internal cavity and an axially moveable cylindrical spool supported within the cavity. Hydraulic ports are defined through the valve body for flow therethrough of hydraulic fluid, each hydraulic port in fluid communication with the cavity. The spool includes one or more radially oriented fluid control floating lands provided thereon. Each floating land is coaxial with the spool, with each floating land being configured to control one or more of: fluid flow from a hydraulic port, and fluid flow to a hydraulic port. Each floating land includes a cylindrical control slide defining a hollow chamber, and an end section. The control slide is axially movable relative to the end section between a retention position and an extension position to thereby control one or more of fluid flow from the hydraulic port, and fluid flow to the hydraulic port. An end section facing side of the control slide defines radially spaced grooves for permitting hydraulic fluid flow from an auxiliary hydraulic fluid pumping system therethrough and into the hollow chamber of the floating land to thereby move the control slide away from the retention position to the extension position. The method further includes delivering hydraulic fluid from the auxiliary hydraulic fluid pumping system into the hollow chamber of the control slide of the floating land, and moving the control slide away from the retention position to the extension position to regulate fluid flow from the hydraulic port or fluid flow to the hydraulic port.

According to at least one embodiment, at least one auxiliary hydraulic port operates a metering port in fluid communication with the auxiliary hydraulic fluid pumping system, wherein a first volume of fluid flow from the auxiliary hydraulic fluid pumping system moves the control slide to a first distance from the end section, and a second volume of fluid flow greater than the first volume of fluid flow from the auxiliary hydraulic fluid pumping system moves the control slide to a second distance greater than the first distance from the end section. According to at least one embodiment, the method further comprises supplying the first volume of fluid flow from the auxiliary hydraulic fluid pumping system to move the control slide to the first distance. According to at least one embodiment, the method further comprises applying the second volume of fluid flow from the auxiliary hydraulic fluid pumping system to move the control slide to the second distance.

According to at least one embodiment, at least one auxiliary hydraulic port operates as a pilot port in fluid communication with the auxiliary hydraulic fluid pumping system, wherein a first volume of fluid flow from the auxiliary hydraulic fluid pumping system moves the control slide to a first distance from the end section to thereby regulate or control fluid flow from at least one hydraulic port or to at least one hydraulic port. According to at least one embodiment, the method further comprises supplying the first volume of fluid flow from the auxiliary hydraulic fluid pumping system to the pilot port to thereby move the control slide to the first distance to thereby regulate or control fluid flow from at least one hydraulic port or to at least one hydraulic port.

According to at least one embodiment, metered adjustment of one or more of a hydraulic fluid volume and a hydraulic fluid flow rate delivered to the chamber of a control slide serviced by a metering port controls or regulates flow of hydraulic fluid to a hydraulic work area, wherein the method further comprises adjusting one or more of the hydraulic fluid volume and the hydraulic fluid flow rate delivered to the chamber of the control slide serviced by a metering port to thereby control or regulate hydraulic fluid to a hydraulic work area at the predetermined flow volume range or the predetermined flow rate range.

Embodiments of the presently disclosed subject matter accordingly provide for a hydraulic valve assembly that can facilitate automated metered adjustment of one or more of a hydraulic fluid volume, a hydraulic fluid flow rate, and a hydraulic fluid pressure being delivered to the chamber of a control slide. Embodiments described herein can provide for an improved hydraulic system that overcomes the limitations of the art in a manner that permits for retrofitting of existing hydraulic systems without the need for extensive rework. The diameter of spool 14 can be set to be identical to that of other spools widely used in hydraulic valve systems.

According to at least one embodiment, a standard flow volume (e.g., 0.5 cubic centimeter or less) from auxiliary hydraulic fluid pump 72 to the chamber of the control slide of an auxiliary hydraulic port operates to return a control slide 24 serviced by the auxiliary hydraulic port to a retention position or to retain the control slides 24 serviced by the auxiliary hydraulic port at the retention position. An operational flow volume (e.g., 6 cubic centimeters) from auxiliary hydraulic fluid pump 72 operates to one or more of move control slide 24 to an extension position, and hold/retain the control slide 24 in the extension position. Accordingly, the system disclosed herein is configured such that a controlled volume of hydraulic fluid from auxiliary hydraulic fluid pump 72 controls the movement of control slide 24 between a retention position and one or more partially extended positions as well as a fully extended position. In some embodiments, a controlled volume of hydraulic fluid from auxiliary hydraulic fluid pump 72 controls the movement of control slide 24 between a retention position and a partially extended position. In various embodiments, grooves 32 are sized to cooperate with an auxiliary hydraulic port 54, 54A, 58 or 58A for flow of hydraulic fluid therethrough and into the chamber of control slide 24. In various embodiments, each floating land 22 can operate as a meter-in flow control valve.

It should be noted that, although the present invention is described with reference to hydraulic cylinders, the cylinders could be air driven or could be any other suitable form of power actuators.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hydraulic valve assembly comprising:
a valve body having a cylindrical internal cavity;
an axially moveable cylindrical spool supported within the cavity;
hydraulic ports defined through the valve body for flow therethrough of hydraulic fluid, each hydraulic port in fluid communication with the cavity;
the spool including one or more radially oriented fluid control floating lands provided thereon;
wherein each floating land is coaxial with the spool;
wherein each floating land is configured to control one or more of: fluid flow from a hydraulic port, and fluid flow to a hydraulic port;
wherein each floating land includes a cylindrical control slide defining a hollow chamber that is open at both ends, and an end section;
wherein the control slide is axially movable relative to the end section between a retention position and an extension position to thereby control one or more of fluid flow from the hydraulic port, and fluid flow to the hydraulic port;
wherein an end section facing side of the control slide defines radially spaced grooves for permitting hydraulic fluid flow from an auxiliary hydraulic fluid pumping system therethrough and into the hollow chamber of the control slide to thereby move the control slide away from the retention position to the extension position.

2. The hydraulic valve assembly of claim 1, wherein the hydraulic ports comprise:
a supply port in fluid communication with a hydraulic fluid pumping system;
a first return port in fluid communication with the hydraulic fluid pumping system;
a first work port in fluid communication with a hydraulically operated piston or device;
a second work port in fluid communication with the hydraulically operated piston or device; and,
an auxiliary hydraulic port.

3. The hydraulic valve assembly of claim 2, wherein the auxiliary hydraulic port is a metering port in fluid communication with an auxiliary hydraulic fluid pumping system, wherein a first volume of fluid flow from the auxiliary hydraulic fluid pumping system moves the control slide to a first distance from the end section, and a second volume of fluid flow greater than the first volume of fluid flow from the auxiliary hydraulic fluid pumping system moves the control slide to a second distance greater than the first distance from the end section.

4. The hydraulic valve assembly of claim 3, wherein metered adjustment of one or more of a hydraulic fluid volume and a hydraulic fluid flow rate delivered to the metering port causes delivery of hydraulic fluid to a hydraulic work area.

5. The hydraulic valve assembly of claim 4, wherein the hydraulic work area is a hydraulic cylinder-piston arrangement.

6. The hydraulic valve assembly of claim 2, wherein each floating land further comprises a biasing member provided within the hollow chamber of the floating land, the biasing member configured for returning the control slide to the retention position when a hydraulic fluid flow volume or flow rate to the hollow chamber of the floating land drops below a predetermined value.

7. The hydraulic valve assembly of claim 6, wherein each floating land further comprises a circumferential rim extending into the chamber provided near the end section facing side of the control slide, and a cap positioned at an end of the control slide opposite the end section facing side of the control slide, wherein the biasing member spans a space between the cap and the circumferential rim.

8. The hydraulic valve assembly of claim 7, wherein the spool further comprises a spool element that screws into the end section of the floating land.

9. A method of operating a hydraulic valve assembly comprising:
provide a hydraulic valve assembly comprising:
a valve body having a cylindrical internal cavity;
an axially moveable cylindrical spool supported within the cavity;
hydraulic ports defined through the valve body for flow therethrough of hydraulic fluid, each hydraulic port in fluid communication with the cavity;
the spool including one or more radially oriented fluid control floating lands provided thereon;
wherein each floating land is coaxial with the spool;
wherein each floating land is configured to control one or more of: fluid flow from a hydraulic port, and fluid flow to a hydraulic port;
wherein each floating land includes a cylindrical control slide defining a hollow chamber that is open at both ends, and an end section;
wherein the control slide is axially movable relative to the end section between a retention position and an extension position to thereby control one or more of fluid flow from the hydraulic port, and fluid flow to the hydraulic port;
wherein an end section facing side of the control slide defines radially spaced grooves for permitting hydraulic fluid flow from an auxiliary hydraulic fluid pumping system therethrough and into the hollow chamber of the control slide to thereby move the control slide away from the retention position to the extension position;
delivering hydraulic fluid from the auxiliary hydraulic fluid pumping system into the hollow chamber of the control slide; and
moving the control slide away from the retention position to the extension position to control or meter fluid flow from the hydraulic port or fluid flow to the hydraulic port.

10. The method of claim 9, wherein the hydraulic ports comprise:
a supply port in fluid communication with a hydraulic fluid pumping system;
a first return port in fluid communication with the hydraulic fluid pumping system;
a first work port in fluid communication with a hydraulically operated piston or device;
a second work port in fluid communication with the hydraulically operated piston or device; and,
an auxiliary hydraulic port.

11. The method of claim 10, wherein the auxiliary hydraulic port is a metering port in fluid communication with the auxiliary hydraulic fluid pumping system, wherein a first volume of fluid flow from the auxiliary hydraulic fluid pumping system moves the control slide to a first distance from the end section, and a second volume of fluid flow greater than the first volume of fluid flow from the auxiliary hydraulic fluid pumping system moves the control slide to a second distance greater than the first distance from the end section.

12. The method of claim 11, wherein the method further comprises supplying the first volume of fluid flow from the auxiliary hydraulic fluid pumping system to move the control slide to the first distance.

13. The method of claim 12, wherein the method further comprises applying the second volume of fluid flow from the auxiliary hydraulic fluid pumping system to move the control slide to the second distance.

14. The method of claim 13, wherein the method further comprises supplying the first volume of fluid flow from the auxiliary hydraulic fluid pumping system to move the control slide to the first distance to thereby regulate or control fluid flow from at least one hydraulic port or to at least one hydraulic port.

15. The method of claim 11, wherein metered adjustment of one or more of a hydraulic fluid volume and a hydraulic fluid flow rate delivered to the metering port causes delivery of hydraulic fluid to a hydraulic work area, wherein the method further comprises adjusting one or more of the hydraulic fluid volume and the hydraulic fluid flow rate delivered to the metering port to deliver hydraulic fluid to a hydraulic work area.

\* \* \* \* \*